United States Patent [19]

Sugawara

[11] Patent Number: 5,339,452
[45] Date of Patent: Aug. 16, 1994

[54] SWITCHING DIVERSITY RECEPTION SYSTEM

[75] Inventor: Kazuaki Sugawara, Tokyo, Japan

[73] Assignee: Pioneer Electronic Corporation, Tokyo, Japan

[21] Appl. No.: 941,375

[22] Filed: Sep. 4, 1992

[30] Foreign Application Priority Data

Sep. 18, 1991 [JP] Japan .............................. 3-074984[U]

[51] Int. Cl.⁵ .......................... H04B 1/10; H04B 7/08
[52] U.S. Cl. ...................................... 455/212; 455/222; 455/277.2; 375/100; 375/104
[58] Field of Search .............. 455/133, 134, 135, 136, 455/140, 144, 212, 222, 219, 223, 277.1, 277.2, 278.1, 283; 375/100, 104

[56] References Cited

U.S. PATENT DOCUMENTS

| | | | |
|---|---|---|---|
| 3,693,088 | 9/1972 | Rustako, Jr. et al. | 455/56.1 |
| 4,041,390 | 8/1977 | Schroeder | 455/219 |
| 4,244,056 | 1/1981 | Hamada et al. | 455/218 |
| 4,525,870 | 6/1985 | Fukuhara et al. | 455/219 |
| 4,633,519 | 12/1986 | Gotoh et al. | |
| 4,864,642 | 9/1989 | Ueno et al. | 455/277.2 |
| 4,947,456 | 8/1990 | Atkinson et al. | 455/218 |

FOREIGN PATENT DOCUMENTS

| | | |
|---|---|---|
| 3324959 | 1/1985 | Fed. Rep. of Germany . |
| 63-252025 | 10/1988 | Japan . |
| 1072273 | 2/1984 | U.S.S.R. . |

Primary Examiner—Reinhard J. Eisenzopf
Assistant Examiner—Lisa Charouel
Attorney, Agent, or Firm—Sughrue, Mion, Zinn, Macpeak & Seas

[57] ABSTRACT

A receiver includes a plurality of antennas, a selection switching unit for selectively switching between the plurality of antennas to output one of the respective output signals of the plurality of antennas having the largest induced voltage, and a unit for converting the selected one antenna output signal to an audio signal to be outputted as an output signal of the receiver. The receiver further includes a muting control unit for detecting the level of the induced voltage of the selected antenna output signal so as to output a muting control signal when the detected level of the induced voltage becomes smaller than a predetermined value, and a muting unit for muting the audio signal for a predetermined time on the basis of the muting control signal. The selection switching unit performs its antenna switching operation on the basis of the muting control signal.

6 Claims, 3 Drawing Sheets

SWITCHING DIVERSITY RECEPTION SYSTEM

BACKGROUND OF THE INVENTION

The present invention generally relates to a receiver, and particularly relates to a radio receiver using a switching diversity reception system in which one of a plurality of antennas is chosen for reception of a signal. The choice is made based on which antenna can best receive a signal. Further, the present invention relates to a receiver suitable for use in a karaoke system (a sing-along audio or video system) including a wireless microphone.

Conventionally, a diversity reception system has been known for obtaining a good reception state by using a plurality of antennas (see Japanese Patent Unexamined Publication No. Sho. 63-252025). Examples of a diversity reception system include a switching diversity system, a selection diversity system, and the like. Referring to FIGS. 2 and 3, a receiver of the switching diversity system will be described by way of an example.

In an FM diversity receiver 100, first and second antennas 1A and 1B are provided at suitable positions as shown in FIG. 2. Output signals of the respective antennas 1A and 1B are selectively applied to a front-end 2 through a switch $SW_5$ which operates in accordance with a switching control signal $S_{SEL}$ supplied from an antenna selection switching circuit (described below). The front-end 2 converts the input signal into an intermediate frequency signal. The intermediate frequency signal is supplied to an IF amplifier 3 where the intermediate frequency signal is subjected to band-amplification to a level not lower than a predetermined value. The AM component of the band-amplified signal is removed by the limiter function of the IF amplifier 3. The thus-processed signal is converted into an audio signal by a detection circuit DET 4 or the like in the succeeding stage.

On the other hand, a level detection circuit 14 generates a field intensity level signal $S_{LV}$ from the intermediate frequency signal of the IF amplifier 3, and supplies the signal Shy to an antenna selection switching circuit 5. Further, the level detection circuit 14 supplies a muting circuit 15 with a muting control MC for causing the muting circuit 15 to perform a muting operation for the purpose of preventing noise signals from being outputted as an audio signal when the level of an antenna input signal is low.

The antenna selection switching circuit 5 has an AGC amplifier 6, which is supplied with the field intensity level signal $S_{LV}$ from the level detection circuit 14 through a coupling capacitor 7. Noise signals contained in the field intensity level signal $S_{LV}$ are amplified and rectified by the AGC amplifier 6. The rectified signal is supplied to a monostable multivibrator $MMV_1$ so as to drive the $MMV_1$ when the level of the signal is not lower than a predetermined value. Then, after the signal has been delayed in a delay circuit 8, a switch $SW_1$ is closed for a time (for example, a few msec) determined by the $MMV_1$.

If noise signals are still present when the switch $SW_1$ is being closed, the rectified component of the noise signals is supplied to a monostable multivibrator $MMV_2$, is waveform-shaped, and is then outputted as a single pulse to a pulse generation circuit 9. The pulse generation circuit 9, triggered by the single pulse output signal of the $MMV_2$, generates pulses A, B, C, D and E successively, as shown in FIG. 3. The pulse A is supplied to a switch $SW_2$ so as to cause a first sample-and-hold circuit 10 to sample and hold the field intensity level of the signal received by the currently selected antenna, for example, the antenna 1B in the illustrated case of FIG. 2.

Next, when the pulse B is generated, the pulse B is supplied to a switch drive 13 so as to switch the connection of the antenna through the switch $SW_5$. The pulse C is supplied to a switch $SW_3$ so as to cause a second sample-and-hold circuit 11 to sample and hold the field intensity level of the signal received by the antenna selected after the switching operation by the pulse B. That is, in the illustrated case, the signal received by antenna 1A is sampled and held by sample-and-hold circuit 11. The respective output signals of the first and second sample-and-hold circuits 10 and 11 are supplied to a comparator circuit 12 so that the field intensity levels of the output signals are compared with each other to thus output a result of such comparison. Next, the pulse D is supplied to a switch $SW_4$ so as to close the switch $SW_4$ so that the result of the comparison outputted from the comparator circuit 12 is supplied to the switch drive 13.

As a result, in the case where the field intensity level sampled-and-held by the first sample-and-hold circuit 10 is higher than that sampled-and-held by the second sample-and-hold circuit 11, the switch drive 13 connects the switch $SW_5$ to the antenna (the antenna 1B in this example) which was used before the last switching operation (performed by using pulse B) and connected to the first sample-and-hold circuit 10. In the contrary case where the field intensity level sampled-and-held by the first sample-and-hold circuit 10 is lower than that sampled-and-held by the second sample-and-hold circuit 11, the switch drive 13 maintains the state in which the switch $SW_5$ is left connected to the antenna (the antenna 1A in this example) used after the last switching operation (performed by using pulse B). Thereafter, the contents of the sample-and-hold circuits 10 and 11 are released in response to the pulse E so as to be ready to cope with the next occurrence of noise.

Therefore, the output signal levels of the antennas 1A and 1B are compared with each other every time noise signals are supplied to the $MMV_2$ so that an antenna having a high field intensity level is always selected. In other words, the output signal levels of both the antennas are compared with each other every time the rectified component of a noise signal is supplied to the $MMV_2$, and a higher-level antenna is always selected.

In the above-mentioned conventional receiver, the setting of the antenna switching operating point by the antenna selection switching circuit 5 is made by adjusting the gain of the AGC amplifier 6 so as to accord with the operating point of the muting circuit 15. Depending on the operating temperature characteristic of the AGC amplifier 6 or that of the muting circuit 15, or depending on the adjusted state of the AGC amplifier 6 or that of the muting circuit 15, however, there sometimes occurs a disagreement between the antenna switching operating point and the muting operating point. When the antenna switching operating point $P_1$ is higher than the muting operating point M (by about 20 dB) as shown in FIG. 4, there occurs a disadvantage that a switching noise signal is present in an audio output signal at the time of antenna switching because the antenna switching is performed in a range of the field intensity level from $P_1$ to M where the muting circuit does not yet operate. Furthermore, when the muting operating point M is higher than the antenna switching operating point $P_2$, there occurs disadvantageously a so-called dead point, that is, a state where antenna switching is not performed in a range of the field intensity level from M to $P_2$ although the muting circuit is operating.

SUMMARY OF THE INVENTION

It is therefore an object of the present invention to eliminate the foregoing defects in the conventional diversity receiving system.

It is another object of the present invention to provide a receiver in which antenna switching is surely performed in accordance with the reception state and in which a muting operation is surely performed so as not to produce unnecessary noise at the time of an antenna switching operation.

In order to attain the above objects, the present invention provides a diversity receiver including a plurality of antennas, means for selectively switching among the plurality of antennas to output one of respective output signals from the antenna having the largest induced voltage, and means for converting the selected one antenna output signal into an audio signal to be outputted as an output signal. The receiver further includes means for detecting the level of the induced voltage of the selected antenna output signal so as to output a muting control signal when the detected level of the induced voltage becomes smaller than a predetermined value, and means for muting the audio signal for a predetermined time on the basis of the muting control signal, wherein the means for selectively switching performs its antenna switching operation on the basis of the muting control signal.

Thus, since the means for muting the audio signal and the means for switching among the plurality of antennas are operated on the basis of the same signal, namely, the muting control signal, the operating points of both the means for muting the audio signal and the means for switching among the plurality of antennas do not diverge from each other. Therefore, unnecessary noise signals are not produced at the time of antenna switching. Further, antenna switching is performed in a state where the field intensity level is not higher than a predetermined value where the muting operation is required, while antenna switching is not performed in a state where the field intensity level is not lower than the predetermined value where the muting operation is not required. This increases the efficiency by not allowing antenna switching when there is no need for muting.

DETAILED DESCRIPTION OF THE PREFERRED EMBODIMENTS

Figure 1:
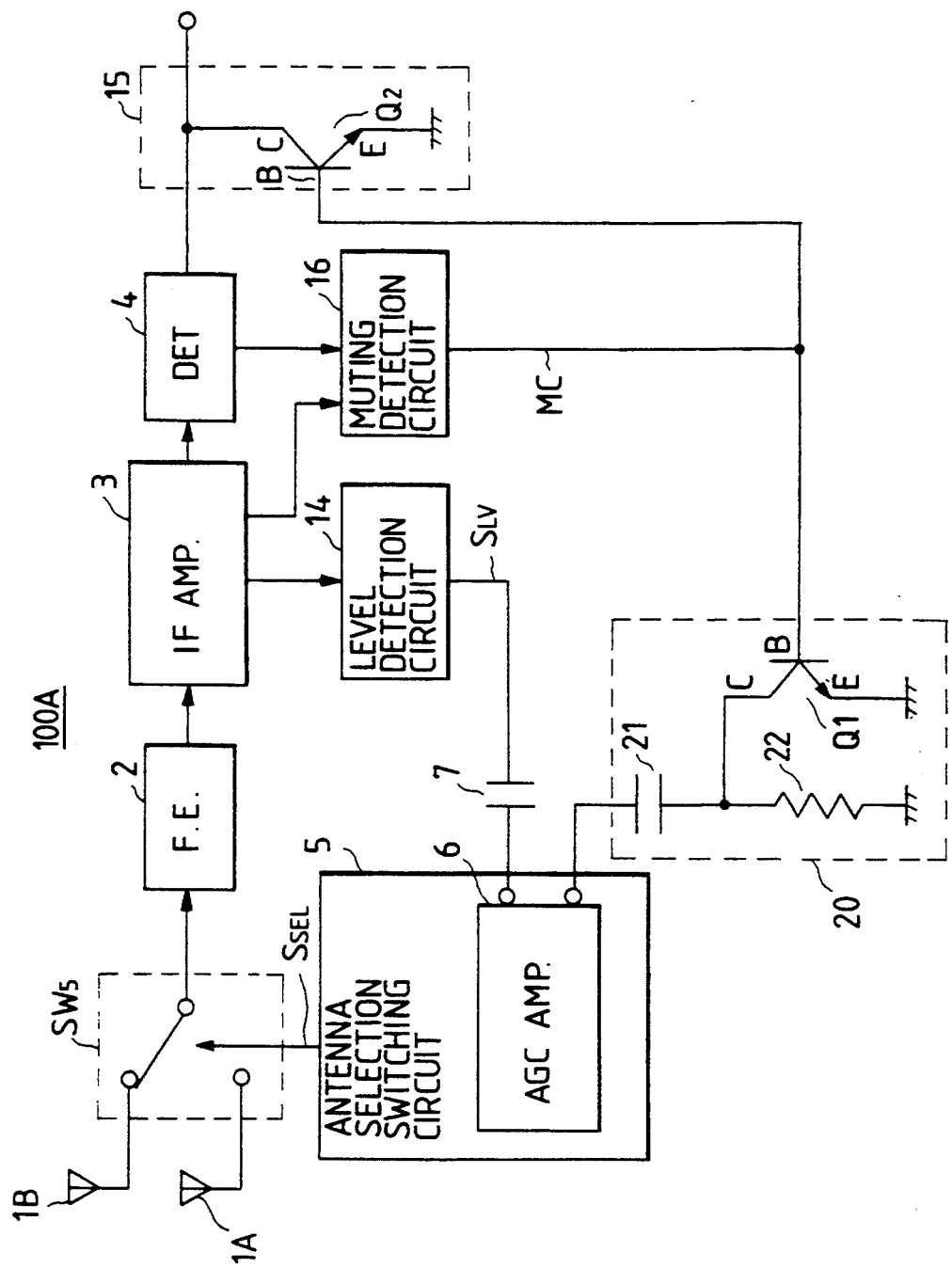
FIG. 1 is a block diagram showing the basic configuration of a preferred embodiment of a diversity receiver of the present invention.
Figure 2:
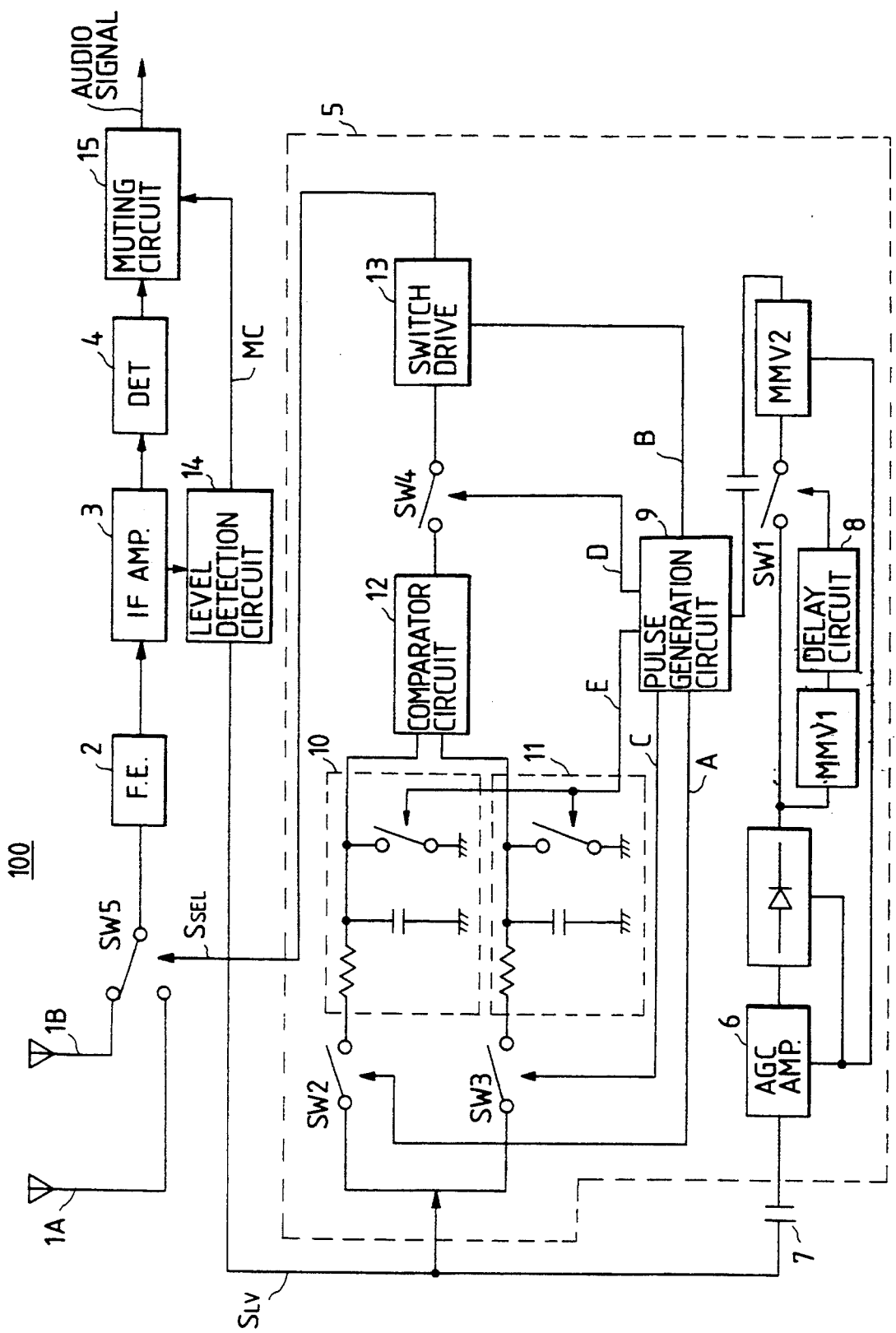
FIG. 2 is a block diagram showing the basic configuration of a conventional receiver.
Figure 3:
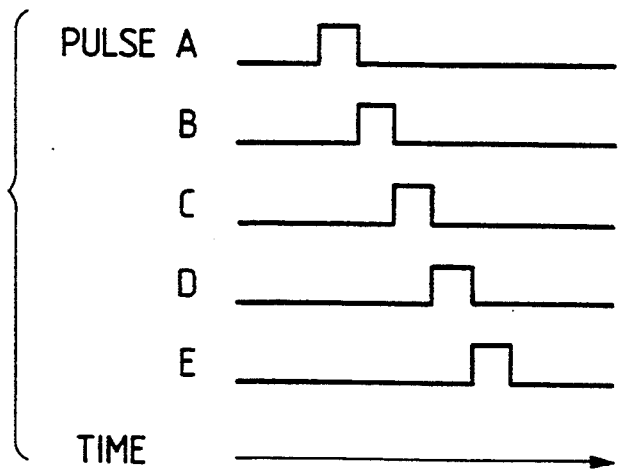
FIG. 3 is a diagram for explaining the pulse generating state in a pulse generator.
Figure 4:
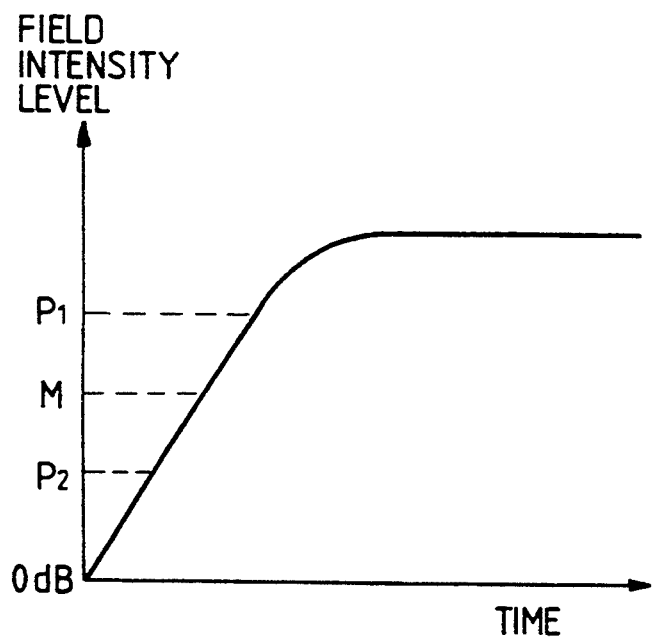
FIG. 4 is a diagram for explaining the problems in the conventional receiver.

Referring to FIG. 1, a preferred embodiment of a receiver of the present invention will be described. In FIG. 1, portions corresponding to those of the conventional example of FIG. 2 are referenced correspondingly, and a further explanation thereof is omitted. The details of the antenna selection switching circuit 5 of FIG. 1 are represented in FIG. 2 by the larger box 5.

The embodiment of the present invention shown in FIG. 1 differs from the conventional example of FIG. 2 in that it is provided with a gain changing circuit 20 for increasing the gain of the AGC amplifier 6 of the antenna selection switching circuit 5 at the time of outputting a muting control signal MC.

Next, the operation of the above preferred embodiment of the present invention will be described. A selected one of the respective output signals of first and second antennas 1A and 1B of a diversity receiver 100A is supplied, through a switch $SW_5$, to a front-end 2 so as to be subjected to high-frequency amplification processing, etc., and the resulting signal then supplied to an IF amplifier 3. The IF amplifier 3 performs intermediate frequency amplification, as described above with respect to FIG. 2. A level detection circuit 14 generates a field intensity level signal $S_{LV}$ from the output signal of the IF amplifier 3, and supplies the field intensity level signal $S_{LV}$ to the AGC amplifier 6 of the antenna selection switching circuit 5 described above.

A muting detection circuit 16 supplies a muting control signal MC to a muting circuit 15 and to the gain changing circuit 20 to cause the muting circuit 15 to perform a muting operation so that a noise signal can be prevented from being outputted as an audio signal. The muting detection circuit 16 includes an OR circuit (not shown) so as to output the muting control signal MC as a result of detection of a state where the FM signal level is low, a state where an impulse noise owing to multipath or the like is mixed, a state where the tuning frequency is shifted, a state where the high-frequency component is detected in the condition where the S/N of an audio output is small, etc.

The gain changing circuit 20 is connected to the AGC amplifier 6 of the antenna selection switching circuit 5. The gain changing circuit 20 has a capacitor 21 for providing a predetermined time constant, the capacitor 21 being connected to ground through a gain adjusting resistor 22. The collector terminal C of a transistor $Q_1$ is connected to the junction between the capacitor 21 and the resistor 22. The emitter E of the transistor $Q_1$ is connected to ground, and the muting control signal MC is applied to the base terminal B of the transistor $Q_1$ so that the gain of the AGC amplifier 6 is increased, that is, the sensitivity of the antenna selection switching circuit 5 is made high, when the muting control signal MC is generated, while the gain of the AGC amplifier 6 is decreased so that antenna switching is suppressed when the muting control signal MC is not generated.

The muting control signal MC is also supplied to the base terminal of a transistor $Q_2$, which constitutes the muting circuit 15, to turn on the transistor $Q_1$ to thus make the output signal of a detection circuit (DET 4) flow to ground to prevent a switching noise signal from being outputted to the output terminal in the state where a noise-free signal is being received at the time of antenna switching.

In this case, the muting control signal MC is continuously outputted from the beginning to the termination of the antenna switching, so that no noise due to the antenna switching is outputted as an audio signal. Further, when the muting control signal MC is not applied, the gain of the AGC amplifier 6 is so small that the antenna switching is suppressed, and therefore the possibility of unnecessary antenna switching being performed when muting is not required is reduced.

Consequently, the muting operation and the antenna switching operation are synchronized with each other, and it is therefore not necessary to strictly adjust the operation point, that is, the gain, of the AGC amplifier 6. Further, the muting operation is surely performed so that no unnecessary noise signal is outputted at the time of generation of a switching noise, and an antenna switching operation is surely performed at the time of the muting operation.

Although description has been given only concerning an FM radio receiver in the foregoing embodiment, the present invention is applicable to other receivers such as a TV set and the like. Further, the present invention is especially applicable to a receiver of a karaoke system or the like. For example, in a sing-along system, the field intensity varies while a singer holding a wireless microphone is moving, so that the switching operation of diversity antennas is performed frequently. In such a situation, the direct wave component of the electric wave is inputted on and off to the receiver, so that noise signals are produced frequently which, absent the invention, would be disturbing. In order to prevent this problem, a receiver constructed according to the invention can be used.

According to the present invention, the operating points between the muting circuit and the antenna selection switching circuit can be prevented from being shifted because both circuits are operated on the basis of the same signal (the muting control signal). As a result, a muting operation is always performed when antenna switching is required. The muting operation and the antenna switching operation are always synchronized with each other so that it is not necessary to strictly adjust the operating point, that is, the gain of the AGC amplifier 6. Further, the muting operation is surely performed so that no unnecessary noise signal is outputted at the time of generation of a switching noise signal, and the antenna switching operation is surely performed at the time of the muting operation.

What is claimed is:

1. A switching diversity reception system comprising:
   a plurality of antennas;
   selection switching means for selectively switching among said plurality of antennas to output one of respective output signals of said plurality of antennas having the largest induced voltage;
   means for converting the selected one antenna output signal to an audio signal to be outputted as an output signal of said system;
   muting control means for detecting a level of the induced voltage of said selected one antenna output signal so as to output a muting control signal when the detected level of said induced voltage is smaller than a predetermined value, said selection switching means performing the antenna switching always in response to said muting control signal so that muting and the antenna switching always occur in synchronism; and
   muting means for muting said audio signal for a predetermined time in response to said muting control signal and in synchronism with said antenna switching.

2. The system as claimed in claim 1, wherein said muting control means is connected to said selection switching means through a circuit for controlling said muting control signal.

3. The system of claim 1 wherein said muting control means outputs the muting control signal at the time of detection of a state where an impulse noise is mixed or a state where a high-frequency component is detected in a condition where a S/N ratio of an audio output is low.

4. A switching diversity reception system comprising:
   a plurality of antennas;
   a selection switching circuit for selectively switching among said plurality of antennas to output one of respective output signals of said plurality of antennas having the largest induced voltage;
   a circuit for converting the selected one antenna output signal to an audio signal to be outputted as an output signal of said system;
   a muting control circuit for detecting a level of the induced voltage or a noise level after conversion of said selected one antenna output signal so as to output a muting control signal when the detected level of said induced voltage becomes smaller than a predetermined value, said selection switching circuit performing the antenna switching always in response to said muting control signal so that muting and the antenna switching always occur in synchronism; and
   a muting circuit for muting said audio signal for a predetermined time in response to said muting control signal and in synchronism with said antenna switching.

5. The system as claimed in claim 4, wherein said selection switching circuit includes an AGC circuit and a signal generating circuit for generating a trigger signal on the basis of an output signal of said AGC circuit to perform the antenna switching, a gain of said AGC circuit being controlled by said muting control signal.

6. The system as claimed in claim 4, wherein said muting control circuit is connected to an IF amplifier and a detection circuit, said IF amplifier and said detection circuit being included in said converting circuit.

* * * * *